US011852496B2

United States Patent
Hara et al.

(10) Patent No.: US 11,852,496 B2
(45) Date of Patent: Dec. 26, 2023

(54) PREDICTABLE AND DELAY TOLERANT TRAFFIC MANAGEMENT SYSTEM

(71) Applicants: Toyota Motor Engineering & Manufacturing North America, Inc., Plano, TX (US); Toyota Motor Corporation, Toyota (JP)

(72) Inventors: Yusuke Hara, Toyota (JP); Kentaro Oguchi, Mountain View, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 207 days.

(21) Appl. No.: 17/144,561

(22) Filed: Jan. 8, 2021

(65) Prior Publication Data

US 2022/0221293 A1 Jul. 14, 2022

(51) Int. Cl.
| | | |
|---|---|---|
| *G01C 21/34* | (2006.01) | |
| *H04W 4/029* | (2018.01) | |
| *G08G 1/01* | (2006.01) | |
| *G08G 1/052* | (2006.01) | |
| *G08G 1/16* | (2006.01) | |

(Continued)

(52) U.S. Cl.
CPC ....... *G01C 21/3492* (2013.01); *B60W 30/143* (2013.01); *B60W 30/18163* (2013.01);
(Continued)

(58) Field of Classification Search
CPC ........... G01C 21/3492; G01C 21/3691; H04W 4/029; B60W 60/0027; B60W 30/143; B60W 30/18163; B60W 50/0097; G08G 1/0125; G08G 1/0133; G08G 1/052; G08G 1/167
See application file for complete search history.

(56) References Cited

U.S. PATENT DOCUMENTS

| | | |
|---|---|---|
| 6,611,750 B2 | 8/2003 | MacPhail et al. |
| 9,741,248 B2 | 8/2017 | Challapali et al. |

(Continued)

FOREIGN PATENT DOCUMENTS

| | | |
|---|---|---|
| CN | 110942652 A | 3/2020 |
| CN | 111583677 A | 8/2020 |

(Continued)

OTHER PUBLICATIONS

Bjorn Schunemann et al, Tamkang Journal of Science and Engineering, "V2X-Based Traffic Congestion Recognition and Avoidance", vol. 13, No. 1, pp. 63-70, 2010, https://citeseerx.ist.psu.edu/viewdoc/download?doi=10.1.1.1031.8062&rep=rep1&type=pdf.

(Continued)

*Primary Examiner* — Peter D Nolan
*Assistant Examiner* — Demetra R Smith-Stewart
(74) *Attorney, Agent, or Firm* — DINSMORE & SHOHL LLP

(57) ABSTRACT

A method of operating a traffic management system comprises receiving data from a vehicle indicating a traffic state, estimating a future time at which the vehicle will receive driving instructions transmitted by the traffic management system, predicting a future traffic state at the estimated future time, determining the driving instructions for the vehicle based on the predicted future traffic state, and transmitting the driving instructions to the vehicle.

20 Claims, 7 Drawing Sheets

(51) Int. Cl.
- *B60W 30/14* (2006.01)
- *B60W 50/00* (2006.01)
- *B60W 60/00* (2020.01)
- *B60W 30/18* (2012.01)
- *G01C 21/36* (2006.01)

(52) U.S. Cl.
CPC .... *B60W 50/0097* (2013.01); *B60W 60/0027* (2020.02); *G01C 21/3691* (2013.01); *G08G 1/0125* (2013.01); *G08G 1/0133* (2013.01); *G08G 1/052* (2013.01); *G08G 1/167* (2013.01); *H04W 4/029* (2018.02); *B60W 2420/42* (2013.01); *B60W 2420/52* (2013.01); *B60W 2420/62* (2013.01); *B60W 2554/408* (2020.02); *B60W 2554/4041* (2020.02); *B60W 2556/50* (2020.02); *B60W 2556/65* (2020.02)

(56) References Cited

U.S. PATENT DOCUMENTS

| | | | |
|---|---|---|---|
| 10,507,739 B2 * | 12/2019 | Takigawa | B60L 7/10 |
| 10,545,027 B2 | 1/2020 | Sharma | |
| 10,553,115 B1 | 2/2020 | Ismaili et al. | |
| 2018/0057001 A1 * | 3/2018 | Hu | B60W 30/18072 |
| 2020/0250973 A1 | 8/2020 | Ohe et al. | |
| 2021/0114616 A1 * | 4/2021 | Altman | H04W 8/205 |
| 2022/0080977 A1 * | 3/2022 | Ucar | G01S 13/931 |
| 2022/0116820 A1 * | 4/2022 | Avedisov | G08G 1/0141 |
| 2022/0201779 A1 * | 6/2022 | Nakamura | H04W 4/025 |

FOREIGN PATENT DOCUMENTS

| | | | | |
|---|---|---|---|---|
| DE | 102010045691 A1 | | 4/2011 | |
| DE | 102011083677 A1 | * | 4/2013 | ......... G01C 21/3697 |
| WO | WO-2018168169 A1 | * | 9/2018 | ........... H04L 1/1642 |
| WO | 2018/132378 A2 | | 2/2020 | |

OTHER PUBLICATIONS

Hao Yang and Ken Oguchi, "Integrated Traffic Management System Under Connected Environment", 2019 IEEE ITSC, Auckland, NZ, Oct. 27-30, 2019, 8 pages.

* cited by examiner

PREDICTABLE AND DELAY TOLERANT TRAFFIC MANAGEMENT SYSTEM

TECHNICAL FIELD

The present specification relates to a traffic management system and more particularly to a predictable and delay tolerant traffic management system.

BACKGROUND

Traffic management systems may be used to improve traffic involving connected vehicles. In particular, connected vehicles may collect data from sensors and other vehicle equipment to determine the state of a connected vehicle (e.g., speed and position) as well as traffic conditions (e.g., positions and speeds of other vehicles). Connected vehicles may then send this collected data to a traffic management system, which may receive such data from a plurality of connected vehicles. The traffic management system may then determine driving instructions for one or more of the connected vehicles, based on the received data, to increase traffic efficiency (e.g., to maximize traffic flow), or to satisfy other goals or constraints. The traffic management system may then send the determined instructions to the connected vehicles, which may perform the appropriate driving actions to implement the driving instructions. This may result in an increase in overall traffic efficiency for connected vehicles and non-connected vehicles alike. However, by the time a connected vehicle receives driving instructions after transmitting sensor data indicating a particular traffic condition, the traffic condition may have changed such that the received driving instructions are no longer useful. Thus, a need exists for a predictable and delay tolerant traffic management system.

SUMMARY

In an embodiment, a method of operating a traffic management system man include receiving data from a vehicle indicating a traffic state, estimating a future time at which the vehicle will receive driving instructions transmitted by the traffic management system, predicting a future traffic state at the estimated future time, determining the driving instructions for the vehicle based on the predicted future traffic state, and transmitting the driving instructions to the vehicle.

In another embodiment, a server comprising a controller may be configured to receive data from a vehicle indicating a traffic state, estimate a future time at which the vehicle will receive driving instructions transmitted by the server, predict a future traffic state at the estimated future time, determine the driving instructions for the vehicle based on the predicted future traffic state, and transmit the driving instructions to the vehicle.

In another embodiment, a traffic management system may include a plurality of sub systems and at least one main system being in a higher hierarchical level than the plurality of sub systems. Each of the plurality of sub systems may be configured to receive data from one or more vehicles indicating a traffic state at a first time, transmit the data received from the one or more vehicles to the main system, receive, from the main system, driving instructions for at least one of the one or more vehicles, and transmit the driving instructions for the at least one of the one or more vehicles to the at least one of the one or more vehicles. The at least one main system may be configured to receive the data from the plurality of sub systems, determine a traffic state at the first time based on the data received from the plurality of sub systems, estimate a second time at which the at least one of the one or more vehicles will receive driving instructions transmitted by one of the sub systems, predict a traffic state at the second time based on the determined traffic state at the first time and the estimated second time, determine driving instructions for the at least one of the one or more vehicles to achieve a predetermined goal, based on the predicted traffic state at the second time, and transmit the determined driving instructions to one or more of the sub systems.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
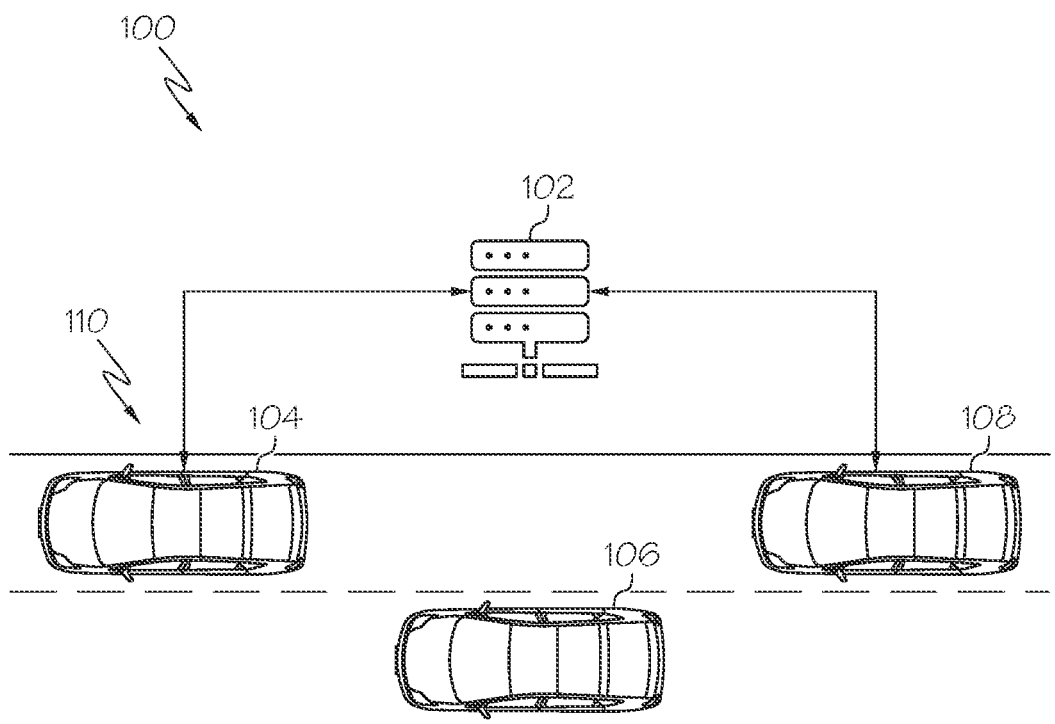
FIG. 1 schematically depicts a system comprising a traffic management system, according to one or more embodiments shown and described herein.

The embodiments disclosed herein include a predictable and delay tolerant traffic management system. It is expected that the number of connected vehicles on the road (both human driven and autonomous) will increase around the world in the next several decades. A connected vehicle is able to communicate remotely with systems outside of the vehicle (e.g., a traffic management system or other vehicles). In particular, a connected vehicle may communicate with a traffic management system.

A connected vehicle may collect a variety of data from sensors and other on-board equipment. This data may include information about the status of the vehicle (e.g., speed, trajectory, and the like). The connected vehicle may also collect data external to the vehicle. For example, vehicle sensors may determine positions, speeds, accelerations, orientations, and trajectories of other vehicles on the road. Vehicle sensors may also collect data about weather, road conditions, or other factors.

Autonomous vehicles may use data collected by vehicle sensors to perform autonomous driving. However, connected vehicles (either autonomous or human-driven) may also transmit collected data to a traffic management system. A traffic management system may receive data from a plurality of connected vehicles. Thus, the traffic management system may determine an overall traffic state on a particular road or within a particular geographic area based on data received from multiple connected vehicles.

Because the traffic management system may receive data from multiple connected vehicles, the traffic management system may determine a more accurate picture of an overall traffic environment than any individual connected vehicle. Furthermore, the traffic management system may determine driving instructions that may be performed by one or more of the connected vehicles to improve the flow of traffic or satisfy other goals or constraints. For example, the traffic management system may determine that traffic flow would be improved if certain vehicles would perform a lane change, adjust their speed, or perform other driving actions.

Accordingly, the traffic management system may determine driving instructions for one or more connected vehicles and may transmit the determined driving instructions to each of the appropriate vehicles. Each connected vehicle that receives driving instructions from the traffic management system may then implement the received driving instructions (either autonomously or by presenting the driving instructions to a human driver). Thus, the overall traffic flow may be improved.

However, after a connected vehicle collects sensor data indicating a current state of the vehicle and/or a current traffic environment, there may be a latency or delay in transmitting the sensor data to the traffic management system. Such a delay may be caused by a time required to aggregate or pre-process data from a variety of sensors or other factors. There may also be a latency between when data is transmitted from a connected vehicle to when it is received by the traffic management system. This latency may be due to the particular communication hardware used by the connected vehicle and the traffic management system, environmental conditions such as adverse weather, or other factors. Accordingly, by the time the traffic management system receives data from a connected vehicle indicating a state of the connected vehicle and/or surrounding traffic, the vehicle state and/or the traffic state may have changed such that it is no longer accurate.

Furthermore, after receiving data from a connected vehicle, there may be a delay before the traffic management system is able to determine driving instructions for the connected vehicle. For example, the traffic management system may transmit the received data to another hierarchical level, which may introduce a latency. In addition, after the traffic management system determines driving instructions for the connected vehicle and transmits the instructions to the vehicle, there may be additional latency before the connected vehicle receives the driving instructions. By this point in time, the vehicle state and/or the traffic state may have changed even more. Accordingly, by the time connected vehicle receives driving instructions from the traffic management system, the traffic environment may have changed such that the driving instructions for the connected vehicle are no longer optimal to increase traffic flow and may in fact even be detrimental.

Thus, disclosed herein is a traffic management system that takes into account the latency between a connected vehicle transmitting sensor data to the traffic management system and the connected vehicle receiving driving instructions from the traffic management system when determining the driving instructions for the connected vehicle. In particular, after receiving sensor data from a connected vehicle, the traffic management system estimates the time at which the connected vehicle will receive instructions from the traffic management system based on an expected latency in transmission and other related factors. Then, the traffic management system predicts what the state of the connected vehicle and/or the traffic state will be at the estimated future time. The traffic management system then determines driving instructions for the connected vehicle based on the predicted vehicle state and traffic state at the estimated future time.

After determining driving instructions for the connected vehicle at the predicted future time, the traffic management system transmits the driving instructions to the connected vehicle. The connected vehicle will receive the driving instructions after some amount of latency. Because the traffic management system accounted for the various latencies in data transmission, the driving instructions received by the connected vehicle may be better suited to the vehicle state and traffic state at the time they are received.

Turning now to the figures, FIG. 1 schematically depicts a system for managing connected vehicles in traffic. A system 100 includes a traffic management system 102. The traffic management system 102 may receive data from one or more connected vehicles, as disclosed herein. In the example of FIG. 1, vehicles 104, 106, and 108 drive along a road 110. In the example of FIG. 1, each of the vehicles 104, 106, 108 may be a human driven non-connected vehicle, a human driven connected vehicle, or an autonomous connected vehicle. As described herein, a connected vehicle is a vehicle that is able to communicate with other systems outside of the vehicle (e.g., with other connected vehicles or with the traffic management system 102). While the example of FIG. 1 shows three vehicles, it should be understood that, in other examples, the system 100 may operate with any number of vehicles. Each of the vehicles 104, 106, 108 may be an automobile or any other passenger or non-passenger vehicle such as, for example, a terrestrial, aquatic, and/or airborne vehicle including, but not limited to, a bus, a scooter, a drone, or a bicycle.

The traffic management system 102 may be communicatively coupled to one or more of the vehicles 104, 106, 108. In some examples, the traffic management system 102 may be a road-side unit (RSU) positioned near the road 110. In these examples, the system 100 may include any number of RSUs spaced along the road 110 such that each RSU covers a different service area. That is, as the vehicles 104, 106, 108 drive along the road 110, the vehicles may be in range of different RSUs at different times such that different RSUs provide coverage at different locations. Thus, as the vehicles 104, 106, 108 drive along the road 110, the vehicles may move between coverage areas of different RSUs.

In other examples, the traffic management system 102 may be another type of server or computing device and may be positioned remotely from the road 110. In some examples, the traffic management system 102 may be an edge server. In some examples, the traffic management system 102 may be a moving edge server, such as another vehicle. In some examples, the traffic management system 102 may be a cloud-based server. In some examples, the traffic management system 102 may be part of a hierarchical traffic management system, as disclosed in further detail below.

As connected vehicles drive along the road 110, the connected vehicles may gather sensor data and may transmit the sensor data to the traffic management system 102. In some examples, the traffic management system 102 may also receive sensor data from other traffic infrastructure (e.g., traffic cameras). The sensor data received by the traffic management system 102 may comprise information about the vehicles on the road 110 (e.g., vehicle speeds and trajectories, positions of vehicles along the road 110, and the like). In some examples, the sensor data received by the traffic management system 102 may also comprise data about other entities positioned along or near the road 110 (e.g., pedestrians, bicycles, and the like). In some examples, the sensor data received by the traffic management system 102 may include data about the road 110 or other traffic infrastructures (e.g., stop lights, intersections, and the like).

After receiving sensor or other data, the traffic management system 102 may determine driving instructions to be performed by one or more of the vehicles 104, 106, 108 in order to achieve one or more goals (e.g., optimizing traffic flow or achieving an optimal traffic formation). When determining driving instructions for connected vehicles to perform, the traffic management system 102 may account for latency in data transmission, as disclosed in further detail below. Details of the traffic management system 102 are discussed in further detail below with respect to FIG. 3.

Figure 2:
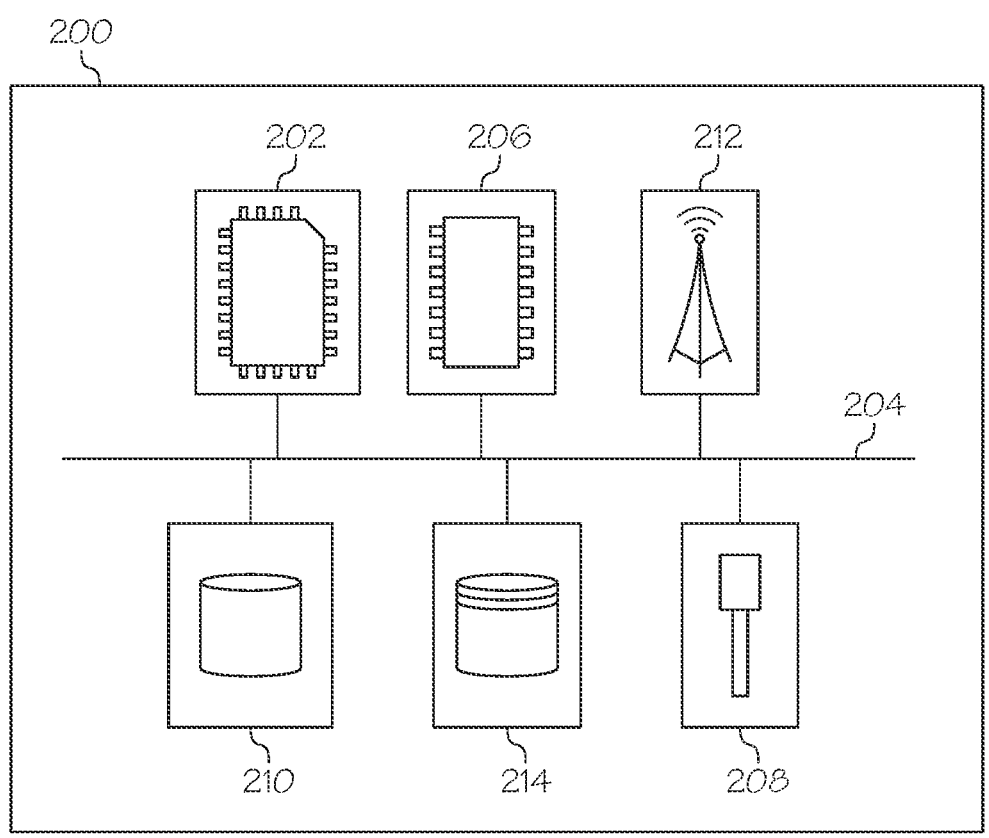
FIG. 2 depicts a schematic diagram of a vehicle system, according to one or more embodiments shown and described herein.

FIG. 2 depicts a vehicle system 200 that may be included in the vehicles 104, 106 and 108 of FIG. 1. The vehicle system 200 includes one or more processors 202, a communication path 204, one or more memory modules 206, a satellite antenna 208, one or more vehicle sensors 210, a network interface hardware 212, and a data storage component 214, the details of which will be set forth in the following paragraphs. The vehicle system 200 may be included in a human driven connected vehicle or in an autonomous connected vehicle.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208, and consequently, the vehicle containing the vehicle system 200.

The vehicle system 200 comprises one or more vehicle sensors 210. Each of the one or more vehicle sensors 210 is coupled to the communication path 204 and communicatively coupled to the one or more processors 202. The one or more sensors 210 may include, but are not limited to, LiDAR sensors, RADAR sensors, optical sensors (e.g., cameras, laser sensors, proximity sensors, location sensors (e.g., GPS modules)), and the like. In embodiments, the sensors 210 may monitor the surroundings of the vehicle and may detect other vehicles on the road. In particular, the sensors 210 may determine locations of other vehicles (which may be connected vehicles and/or non-connected vehicles). For example, in the example of FIG. 1, the sensors 210 of the vehicle 108 may detect the vehicles 106 and 104 and determine their locations relative to the location of the vehicle 108. In some examples, the sensors 210 may determine other information about detected vehicles (e.g., speeds of vehicles).

For autonomous vehicles, the vehicle system 200 may include an autonomous driving module (not shown) and the data gathered by the sensors 210 may be used by the autonomous driving module to autonomously navigate the vehicle. In both autonomous and non-autonomous connected vehicles, the data gathered by the sensors 210 may be used to manage connected vehicles, as disclosed in further detail below.

Still referring to FIG. 2, the vehicle system 200 comprises network interface hardware 212 for communicatively coupling the vehicle system 200 to the traffic management system 102 and/or another vehicle system. The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol. In embodiments, the network interface hardware 212 of the vehicle system 200 may transmit sensor data gathered by the sensors 210 to the traffic management system 102.

Still referring to FIG. 2, the vehicle system 200 comprises a data storage component 214. The data storage component 214 may store data used by various components of the vehicle system 200. In addition, the data storage component 214 may store data gathered by the sensors 210.

The vehicle system 200 may also include an interface (not shown). The interface may allow for data to be presented to a human driver and for data to be received from the driver. For example, the interface may include a screen to display information to a driver, speakers to present audio information to the driver, and a touch screen that may be used by the driver to input information. In other examples, the vehicle system 200 may include other types of interfaces.

In some embodiments, the vehicle system 200 may be communicatively coupled to the traffic management system 102 by a network (not shown). In one embodiment, the network may include one or more computer networks (e.g., a personal area network, a local area network, or a wide area network), cellular networks, satellite networks and/or a global positioning system and combinations thereof. Accordingly, the vehicle system 200 can be communicatively coupled to the network via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Figure 3:
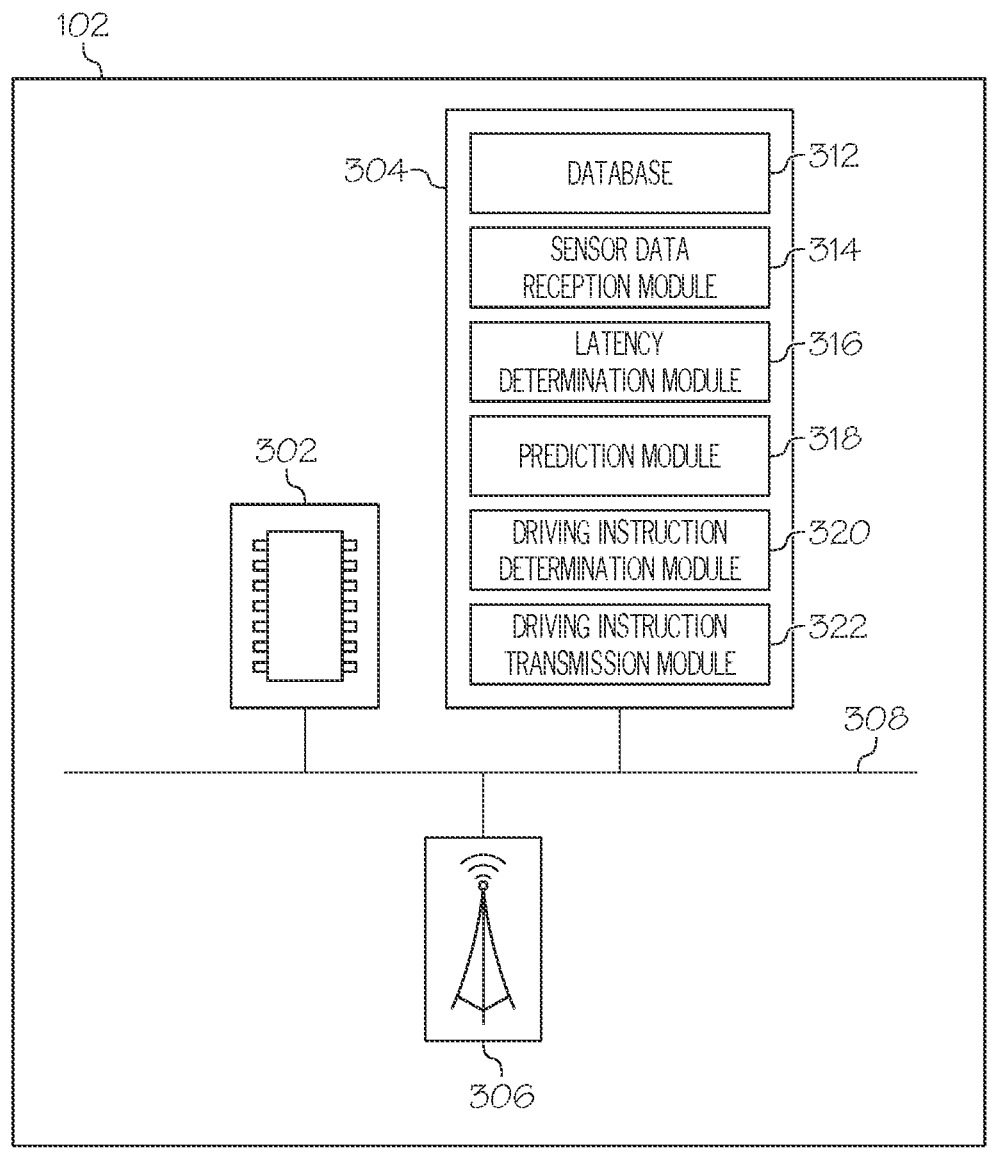
FIG. 3 depicts a schematic diagram of the traffic management system of FIG. 1, according to one or more embodiments shown and described herein.

Now referring to FIG. 3, the traffic management system 102 comprises one or more processors 302, one or more memory modules 304, network interface hardware 306, and a communication path 308. The one or more processors 302 may be a controller, an integrated circuit, a microchip, a computer, or any other computing device. The one or more memory modules 304 may comprise RAM, ROM, flash memories, hard drives, or any device capable of storing machine readable and executable instructions such that the machine readable and executable instructions can be accessed by the one or more processors 302.

The network interface hardware 306 can be communicatively coupled to the communication path 308 and can be any device capable of transmitting and/or receiving data via a network. Accordingly, the network interface hardware 306 can include a communication transceiver for sending and/or receiving any wired or wireless communication. For example, the network interface hardware 306 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 306 includes hardware configured to operate in accordance with the Bluetooth® wireless communication protocol. The network interface hardware 306 of the traffic management system 102 may transmit and receive data to and from connected vehicles (e.g., vehicles 104, 106, 108 of FIG. 1). In some examples, the network interface hardware 306 may transmit and receive data to and from other hierarchical traffic management systems, as described below in connection with FIG. 4.

The one or more memory modules 304 include a database 312, a sensor data reception module 314, a latency determination module 316, a prediction module 318, a driving instruction determination module 320, and a driving instruction transmission module 322. Each of the database 312, the sensor data reception module 314, the latency determination module 316, the prediction module 318, the driving instruction determination module 320, and the driving instruction transmission module 322 may be a program module in the form of operating systems, application program modules, and other program modules stored in one or more memory modules 304. In some embodiments, the program module may be stored in a remote storage device that may communicate with the traffic management system 102. In some embodiments, one or more of the database 312, the sensor data reception module 314, the latency determination module 316, the prediction module 318, the driving instruction determination module 320, and the driving instruction transmission module 322 may be stored in the one or more memory modules 206 of the vehicle system 200 of a vehicle. Such a program module may include, but is not limited to, routines, subroutines, programs, objects, components, data structures and the like for performing specific tasks or executing specific data types as will be described below.

The database 312 may temporarily store sensor data received from connected vehicles. The database 312 may also store other data that may be used by the memory modules 304 and/or other components of the traffic management system 102.

The sensor data reception module 314 may receive data captured by sensors of connected vehicles (e.g., the vehicles 104, 106, 108 of FIG. 1). The sensor data received by the sensor data reception module 314 may include positions, speeds, accelerations, orientations, trajectories, and other information about vehicles detected by one or more connected vehicles. In some examples, the sensor data reception module 314 may receive data captured by traffic infrastructure (e.g., traffic cameras) or other entities. The sensor data received by the sensor data reception module 314 may be used by the traffic management system 102 to a traffic state at the time the sensor data was captured.

Data captured by connected vehicles may include a timestamp indicating when the data was captured. The timestamp may be transmitted to the traffic management system 102 and received by the sensor data reception module 314 along with the sensor data itself. In some examples, a connected vehicle may also include a timestamp indicating when data is transmitted to the traffic management system 102, if the time of transmission of the data is different from the time the data is gathered. The traffic management system 102 may utilize the timestamps associated with sensor data to determine a latency of data transmission, as disclosed herein.

In some examples, the traffic management system 102 may be part of a hierarchical system. In these examples, connected vehicles may transmit sensor data to a plurality of sub-systems. Each sub-system may then route the sensor data to a main system, which may be one level above the sub-systems in a hierarchical relationship. An example of a hierarchical traffic management system is shown in FIG. 4.

Figure 4:
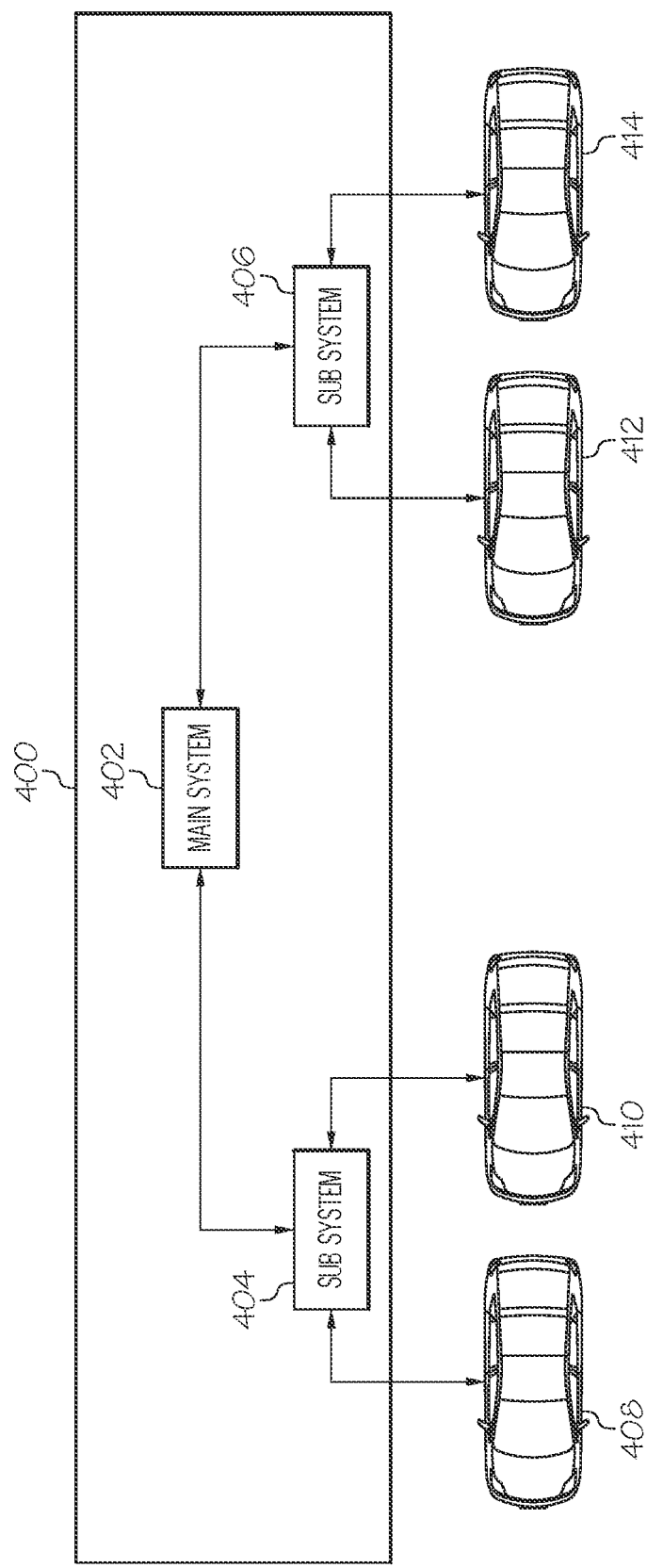
FIG. 4 depicts a schematic diagram of another traffic management system involving hierarchical levels, according to one or more embodiments shown and described herein.

In the example of FIG. 4, a traffic management system 400 includes a main system 402 (e.g., a city manager) and sub systems 404 and 406 (e.g., section managers). Connected vehicles 408, 410, 412, and 414 are shown in the example of FIG. 4 for purposes of illustration. In the example of FIG. 4, the connected vehicles 408 and 410 transmit sensor data to the sub system 404 and the connected vehicles 412 and 414 transmit sensor data to the sub system 406. The sub systems 404 and 406 may comprise edge servers or RSUs located at different locations along a road or along different roads. As such, each of the sub systems 404, 406 may provide coverage to a different geographic area.

After the sub systems 404 and 406 receive the sensor data from vehicles 408, 410 and vehicles 412, 414, respectively, the sub systems 404 and 406 may transmit the received sensor data to the main system 402. Accordingly, each sub system 404, 406 may receive sensor data from connected vehicles in a small geographic area and may relay the sensor data to the main system 402, which may cover a larger geographic area. The main system 402 may then utilize the data in a similar manner as the traffic management system 102 of FIG. 3.

In particular, the main system 402 may determine driving instructions for each of the vehicles 408, 410, 412, and 414. The main system 402 may then transmit the driving instructions for vehicles 408 and 410 to the sub system 404, which may relay the driving instructions to each vehicle. Similarly, the main system 402 may transmit the driving instructions for vehicles 412 and 414 to the sub system 406, which may relay the driving instructions to the appropriate vehicle. This may allow the main system 402 to determine driving instructions for connected vehicles to optimize traffic flow over a larger geographic area without needing to directly communicate with a large number of connected vehicles. As such, this may save bandwidth and increase the efficiency of the traffic management system 400.

Referring back to FIG. 3, the latency determination module 316 may determine an estimated latency between a time that a connected vehicle transmits sensor data to the traffic management system 102 and a time that the connected vehicle receives driving instructions transmitted by the traffic management system 102. This may include a latency in transmission of sensor data from the connected vehicle to the traffic management system 102, a latency in transmission of driving instructions from the traffic management system 102 to the connected vehicle, a latency in transmission of data between hierarchical components of the traffic management system 102, and any other latencies that may occur.

Figure 5:
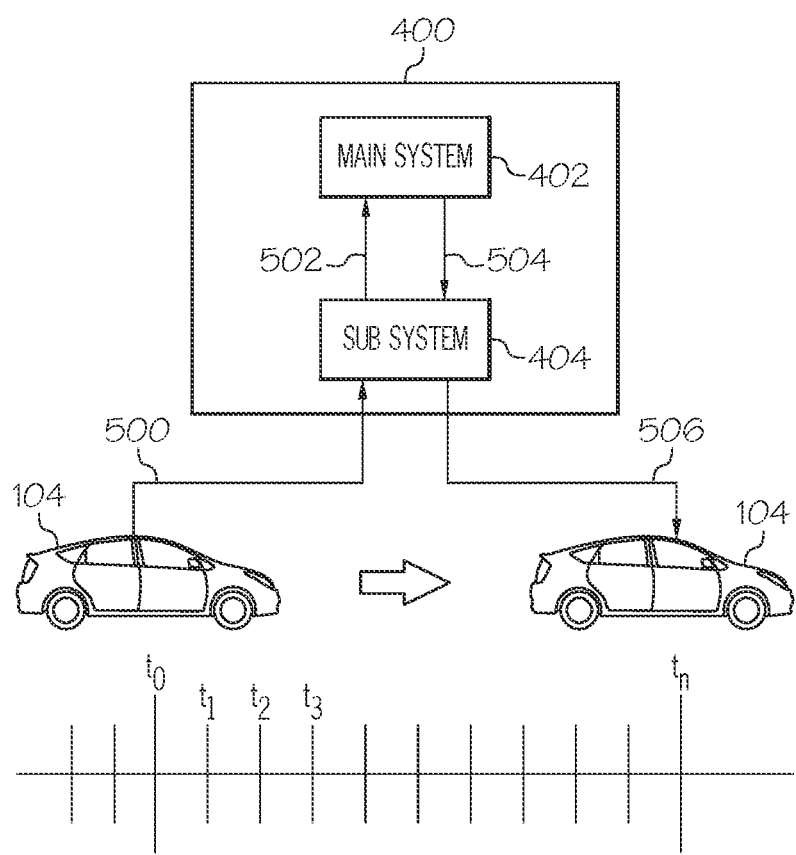
FIG. 5 illustrates an example operation of a traffic management system involving hierarchical levels according to one or more embodiments shown and described herein.

FIG. 5 illustrates an example situation where latency may be present. In the example of FIG. 5, a connected vehicle 104 transmits sensor data to the traffic management system 400 of FIG. 4 at a time $t_0$. A first latency 500 is introduced between the time to when the connected vehicle 104 transmits sensor data and a later time when the sensor data is received by the sub system 404 of the traffic management system 400. The sub system 404 then transmits the received sensor data to the main system 402, which introduces a second latency 502 between the time the sensor data is transmitted by the sub system 404 and the time the sensor data is received by the main system 402. The main system 402 then determines driving instructions for the vehicle 104 and transmits the driving instructions to the sub system 404. This introduces a third latency 504 between the time the driving instructions are transmitted from the main system 402 and the time the driving instructions are received by the sub system 404. The sub system 404 then transmits the received driving instructions to the connected vehicle 104. This introduces a fourth latency 506 between the time the driving instructions are transmitted by the sub system 404 and the time $t_n$ when the vehicle 104 receives the driving instructions.

As shown in FIG. 5, between the time to when the connected vehicle 104 transmits sensor data to the traffic management system 400 and the time $t_n$ when the vehicle 104 receives driving instructions from the traffic management system 400, the state of the vehicle 104 has changed as the vehicle 104 has continued driving. In addition, other vehicles on the road will continue driving as well, thereby resulting in a change to the traffic state. Thus, the traffic management system 400 may account for this latency as described herein.

In examples where a traffic management system does not include hierarchical levels, such as the traffic management system 102 of FIG. 3, there will be no latency introduced by the transmission of data between hierarchical levels. Thus, in the example of FIG. 5, latencies 502 and 504 will not be introduced. However, there will still be latencies between the transmission of data between the connected vehicle and the traffic management system (e.g., latencies 500 and 506 in FIG. 5).

Referring back to FIG. 3, the latency determination module may determine an estimated latency between a time that a connected vehicle transmits sensor data to the traffic management system 102 and a time that the connected vehicle will receive driving instructions from the traffic management system 102. As explained above with reference to FIG. 5, a first part of that latency comprises a delay between a time when sensor data is transmitted by a connected vehicle and a time when the sensor data is received by the traffic management system 102 (latency 500 in FIG. 5). As further explained above, in some examples, when a connected vehicle transmits sensor data to the traffic management system 102, the connected vehicle may include timestamps indicating when the data was gathered and/or when the data was transmitted. In some examples, the latency determination module 316 may utilize these timestamps to estimate a latency in transmission, as described herein.

If sensor data transmitted by a connected vehicle to the traffic management system 102 includes a timestamp indicating that the data was transmitted at a time to, and the sensor data was actually received by the traffic management system 102 at a time $t_1$, the latency determination module 316 may estimate a latency in transmission between the connected vehicle and the traffic management system 102 of a time equal to the difference between $t_0$ and $t_1$. In some examples, the latency determination module 316 may monitor this latency in transmission over time and determine a historical average. For example, whenever sensor data is received from a connected vehicle, the latency determination module 316 may determine a latency in transmission based on a difference between a time when the data was transmitted (as indicated by a timestamp associated with the data) and a time when the data is received. The latency determination module 316 may then determine a running average of the latency in transmission. Then, when estimating a latency in transmission between a connected vehicle and the traffic management system 102, the latency determination module 316 may use the running average as an estimate of latency. This may avoid spurious estimates based on particular data packets that were received after an unusually short or long delay.

In some examples, the latency determination module 316 may estimate a separate latency in transmission between each vehicle and the traffic management system 102. That is, the latency determination module 316 may individually estimate a transmission latency associated with each connected vehicle (e.g., by maintaining a historical record of transmission latencies associated with each connected vehicle that transmits data to the traffic management system 102). In other examples, the latency determination module 316 may estimate a single latency in transmission that may be applied to all connected vehicles transmitting data to the traffic management system 102 (e.g., by maintaining a historical record that aggregates transmission latencies associated with all vehicles that transmit data to the traffic management system 102). In some examples, the latency determination module 316 may estimate different transmission latencies associated with vehicles in different geographic locations (e.g., by maintaining historical records that aggregate transmission latencies associated with vehicles that transmit sensor data from particular geographic areas).

In some examples, the latency determination module 316 may estimate transmission latencies based on weather conditions (e.g., latency estimates may be increased in adverse weather conditions). In some examples, the latency determination module 316 may estimate transmission latencies based on bandwidth usage (e.g., latency estimates may be increased if communication is ongoing between the traffic management system 102 and many connected vehicles). In some examples, the latency determination module 316 may estimate transmission latencies based on the types of communication hardware used by a connected vehicle and the traffic management system 102. In other examples, the latency determination module 316 may estimate transmission latencies based on other factors.

In addition to a latency in transmission between a connected vehicle and the traffic management system 102, there may also be a transmission latency between the traffic management system 102 and a connected vehicle (latency 506 in FIG. 5). In some examples, the latency determination module 316 may estimate a latency in transmission between the traffic management system 102 and a connected vehicle to be the same as a latency in transmission between the connected vehicle and the traffic management system 102 (e.g., based on a difference between a timestamp indicating when sensor data was transmitted by a connected vehicle and a time when the sensor data is received by the traffic management system 102). That is, the latency determination module 316 may estimate that the latencies 500 and 506 of FIG. 5 are the same. In other examples, the latency determination module 316 may estimate different transmission latencies between a connected vehicle and the traffic management system 102 and between the traffic management system 102 and a connected vehicle.

In examples in which the traffic management system 102 is part of a hierarchical system (e.g., in the example of FIG. 4), the latency determination module 316 may further estimate transmission latencies between the hierarchical levels (e.g., latencies 502 and 504 of FIG. 5). For instance, in the example of FIG. 4, sub system 404 may transmit sensor data received by vehicle 408 to the main system 402 along with a timestamp indicating a time that the data was transmitted. Then, when the main system 402 receives the data from the sub system 404, the main system 402 may determine the time at which the data was received and compare that time to the timestamp indicating the time that the data was transmitted to determine a transmission latency between the sub system 404 and the main system 402. The main system 402 may then estimate a similar transmission latency to transmit driving instruction data from the main system 402 to the sub system 404. Alternatively, the main system 402 may determine a different transmission latency between the main system 402 and the sub system 404 based on a variety of factors.

The latency determination module 316 may aggregate all such estimated transmission latencies (e.g., latencies 500, 502, 504, and 506 of FIG. 5) to estimate a total transmission latency. The latency determination module 316 may also estimate other delays such as a time required to process data or a time required for the prediction module 318 or the driving instruction determination module 320 to operate. The latency determination module 316 may aggregate all such transmission latencies and other delays to estimate a total latency between a first time at which a connected vehicle transmits sensor data to the traffic management system 102 and a second time at which the connected vehicle receives driving instructions from the traffic management system 102.

Referring still to FIG. 3, the prediction module 318 may predict a traffic state at an estimated time when driving instructions will be received by one or more connected vehicles. As discussed above, a connected vehicle may transmit sensor data to the traffic management system 102 indicating a traffic state at a time when the sensor data was collected. The connected vehicle may also transmit a timestamp indicating a time at which the sensor data was collected. Accordingly, when the sensor data reception module 314 receives the sensor data, the traffic management system 102 may determine the traffic state at the time the sensor data was collected by the connected vehicle. Furthermore, as discussed above, the latency determination module 316 may estimate a latency between when the sensor data is transmitted by the connected vehicle and when driving instructions transmitted by the traffic management system 102 will be received by the connected vehicle. Thus, the prediction module 318 may predict the traffic state at a time that driving instructions will be received by the connected vehicle based on the initial traffic state, as determined by the sensor data received by the sensor data reception module 314, and the latency estimated by the latency determination module 316.

A variety of prediction algorithms may be used by the prediction module 318 to predict a future traffic state. For example, the prediction module 318 may utilize a linear model, a machine learning algorithm, or any other model or algorithm or combination of models and/or algorithms to determine a future traffic state. The future traffic state predicted by the prediction module 318 may include positions of connected and non-connected vehicles, speeds, accelerations, orientations, and trajectories of those vehicles, positions of non-vehicular entities (e.g., pedestrians), and any other factors affecting traffic.

Referring still to FIG. 3, the driving instruction determination module 320 may determine driving instructions for one or more connected vehicles based on the traffic state predicted by the prediction module 318. The driving instruction determination module 320 may determine driving instructions based on a particular goal and/or constraints. For example, the driving instruction determination module 320 may determine driving instructions for one or more connected vehicles in order to achieve a desired traffic formation. That is, the driving instruction determination module 320 may determine driving instructions for one or more connected vehicles to transform the traffic formation predicted by the prediction module 318 into a desired traffic formation. The driving instructions may include instructions for controlling a speed, an acceleration, or an orientation of the vehicle. A desired traffic formation may be a traffic formation that improves overall traffic flow, improves overall fuel efficiency, or meets any other specified goals.

In some examples, the driving instruction determination module 320 may run one or more applications to achieve a particular result. In some examples, a particular application may be run in response to a request from a connected vehicle that may be transmitted to the traffic management system 102 along with sensor data.

One example application is a dynamic routing application. In this example, a connected vehicle requests transmits a request to the traffic management system 102 to dynamically determine a route to a particular location. This request may be in response to adverse traffic conditions along a current route of the vehicle or due to a change in the desired destination of the vehicle. In this example, the driving instruction determination module 320 may run a dynamic routing application to dynamically determine a new route for the connected vehicle. The driving instruction determination module 320 may determine driving instructions for the connected vehicle to follow to take the new dynamically selected route based on the traffic state at the time the driving instructions will be received by the connected vehicle, as predicted by the prediction module 318.

Another example application is a lane change assistance application. In this example, a connected vehicle may request assistance from the traffic management system 102 in performing a lane change. The lane change assistance application may determine driving instructions for the connected vehicle to perform the requested lane change based on the traffic state at the time the driving instructions will be received by the connected vehicle, as predicted by the prediction module 318. The driving instructions determined by the lane change assistance application may be based on trajectory information of the connected vehicle and other nearby vehicles and positions of the connected vehicle and other vehicles in lanes of the road on which they are driving. In some examples, the trajectory information of the connected vehicle and/or other vehicles may be accumulated over time (e.g., based on multiple sensor data transmissions from the connected vehicle).

After the driving instruction determination module 320 determines driving instructions for one or more connected vehicles, the driving instruction transmission module 322 may transmit the determined driving instructions to the connected vehicles. Each vehicle may then receive the appropriate driving instructions and may perform the driving instructions (either autonomously or via a human driver). By performing the received driving instructions, the connected vehicles may improve traffic flow or achieve other desired outcomes. Furthermore, because the traffic management system 102 estimated latencies in transmission and determined driving instructions based on a predicted traffic state at the time that the driving instructions were estimated to be received by the connected vehicles, the driving instructions may be more applicable to the current traffic situation than if the traffic management system 102 had not taken latencies into account when determining driving instructions.

Figure 6:
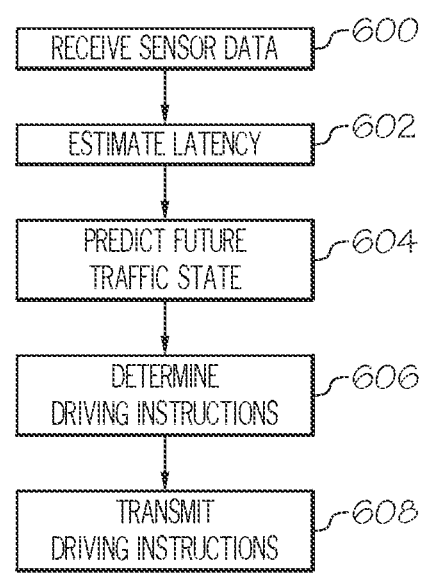
FIG. 6 depicts a flowchart of a method for operating the traffic management system of FIGS. 1 and 3, according to one or more embodiments shown and described herein.

FIG. 6 depicts a flowchart for operating the traffic management system 102 of FIGS. 1 and 3. At step 600, the sensor data reception module 314 receives sensor data transmitted by a connected vehicle. The sensor data reception module 314 may also receive timestamps indicating when the sensor data was gathered by the connected vehicle and/or when the data was transmitted by the connected vehicle. The sensor data may indicate a traffic state (e.g., positions, speeds, accelerations, orientations, and trajectories of one or more vehicles) at the time the sensor data was gathered by the connected vehicle.

At step 602, the latency determination module 316 estimates a latency between a first time at which the connected vehicle transmits sensor data to the traffic management system 102 and a second time at which the connected vehicle will receive driving instructions from the traffic management system 102. The latency estimated by the latency determination module 316 may include a latency in transmission from the connected vehicle to the traffic management system 102 and a latency in transmission from the traffic management system 102 to the connected vehicle. The latency estimated by the latency determination module 316 may also include other latencies that may increase a delay between when sensor data is sent by the connected vehicle and when driving instructions are received by the connected vehicle.

At step 604, the prediction module 318 predicts a future traffic state involving the connected vehicle that transmitted the sensor data. In particular, the prediction module 318 predicts what the traffic state will be at the time the driving instructions transmitted by the traffic management system 102 are received by the connected vehicle. The prediction module 318 may predict the future traffic state based on the traffic state associated with the received sensor data (e.g., the traffic state when the sensor data was collected) and the latency estimated by the latency determination module 316.

At step 606, the driving instruction determination module 320 determines driving instructions for one or more connected vehicles. The driving instructions may be determined such that a predetermined goal is achieved (e.g., increase traffic flow or achieve an optimal traffic formation). In some examples, the driving instruction determination module 320 may run one or more applications to satisfy a request received by a connected vehicle (e.g., to provide dynamic routing or lane change assistance). The driving instruction determination module 320 determines driving instructions for connected vehicles based on the traffic state that is predicted to occur when the one or more connected vehicles receive the driving instructions.

At step 608, the driving instruction transmission module 322 transmits the driving instructions determined by the driving instruction determination module 320 to the one or more connected vehicles for which the driving instructions were determined. The connected vehicles may then receive and implement the determined driving instructions.

Figure 7:
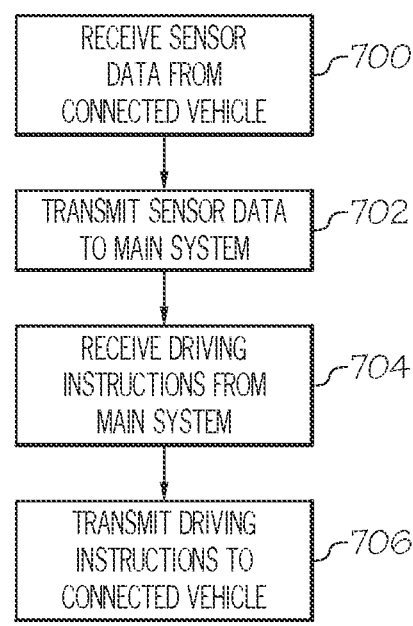
FIG. 7 depicts a flowchart of a method for operating the traffic management system of FIG. 4, according to one or more embodiments shown and described herein.

FIG. 7 depicts a flowchart for operating the example sub system 404 of the traffic management system 400 of FIG. 4. At step 700, the sub system 404 receives sensor data from a connected vehicle (e.g., vehicle 408 or 410). After receiving the sensor data, at step 702, the sub system 404 transmits the received sensor data to the main system 402. The main system 402 may then estimate latency, predict a future traffic state based on the latency, and determine driving instructions for one or more connected vehicles based on the predicted future traffic state in a manner as described above with respect to the traffic management system 102.

The main system may transmit the driving instructions determined for one or more connected vehicles to the sub system 404. At step 704, the sub system 404 receives the driving instructions for one or more connected vehicles from the main system 402. At step 706, the sub system 404 transmits the driving instructions received from the main system 402 to the appropriate connected vehicles. That is, for each connected vehicle for which the sub system 404 receives driving instructions, the sub system 404 transmits the driving instructions to that vehicle.

It should now be understood that embodiments described herein are directed to a predictable and delay tolerant traffic management system. A connected vehicle may collect sensor data indicating a current traffic state. The connected vehicle may then transmit the sensor data to a traffic management system. The traffic management system may estimate a latency or delay between a first time that the connected vehicle transmits sensor data to the traffic management system and a second time that the connected vehicle will receive driving instructions transmitted by the traffic management system.

The traffic management system may then predict a traffic state at an estimated time at which the connected vehicle will receive driving instructions from the traffic management system, based on the estimated latency. The traffic management system may then determine driving instructions to be performed by the connected vehicle to achieve a particular goal. The traffic management system may then transmit the determined driving instructions to the connected vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of operating a traffic management system comprising:
   receiving data from a vehicle indicating a traffic state;
   estimating a future time at which the vehicle will receive driving instructions transmitted by the traffic management system;
   predicting a future traffic state at the estimated future time;
   determining the driving instructions for the vehicle based on the predicted future traffic state; and
   transmitting the driving instructions to the vehicle to cause the vehicle to perform autonomous driving to implement the driving instructions.

2. The method of claim 1, wherein the data received from the vehicle comprises data captured by one or more sensors attached to the vehicle.

3. The method of claim 1, wherein the traffic state comprises positions, speeds, and trajectories of one or more vehicles.

4. The method of claim 1, further comprising:
   estimating a first latency in transmission from the vehicle to the traffic management system;
   estimating a second latency in transmission from the traffic management system to the vehicle; and
   estimating the future time at which the vehicle will receive the driving instructions transmitted by the traffic management system based on the first latency and the second latency.

5. The method of claim 1, further comprising:
   receiving a timestamp indicating a first time that the data was transmitted from the vehicle; and
   estimating the future time based on the timestamp indicating the first time and a second time at which the traffic management system receives the data from the vehicle.

6. The method of claim 5, further comprising:
   estimating a latency in transmission from the vehicle to the traffic management system based on a difference between the first time and the second time.

7. The method of claim 5, further comprising:
   estimating a latency in transmission from the traffic management system to the vehicle based on a difference between the first time and the second time.

8. The method of claim 1, further comprising:
   receiving a timestamp indicating a time at which the data was collected by the vehicle; and
   estimating the future time based on the timestamp indicating the time at which the data was collected by the vehicle.

9. The method of claim 1, further comprising:
   estimating a latency caused by transmission of data between different hierarchical levels of the traffic management system; and
   estimating the future time based on the estimated latency.

10. The method of claim 1, further comprising:
    determining driving instructions for the vehicle to control a speed, an acceleration, or an orientation of the vehicle based on the predicted future traffic state.

11. The method of claim 1, further comprising:
    determining driving instructions for the vehicle to dynamically route the vehicle to a selected location based on the predicted future traffic state.

12. The method of claim 1, further comprising:
    determining driving instructions for the vehicle to provide lane change assistance to the vehicle based on the predicted future traffic state.

13. A server comprising a controller configured to:
    receive data from a vehicle indicating a traffic state;
    estimate a future time at which the vehicle will receive driving instructions transmitted by the server;
    predict a future traffic state at the estimated future time;
    determine the driving instructions for the vehicle based on the predicted future traffic state; and
    transmit the driving instructions to the vehicle to cause the vehicle to perform autonomous driving to implement the driving instructions.

14. The server of claim 13, wherein the controller is further configured to:
    estimate a first latency in transmission from the vehicle to the server;
    estimate a second latency in transmission from the server to the vehicle; and
    estimate the future time at which the vehicle will receive the driving instructions transmitted by the server based on the first latency and the second latency.

15. The server of claim 13, wherein the controller is further configured to:
receive a timestamp indicating a first time that the data was transmitted from the vehicle; and
estimate the future time based on the timestamp indicating the first time and a second time at which the server receives the data from the vehicle.

16. The server of claim 15, wherein the controller is further configured to:
estimate a latency in transmission from the vehicle to the server based on a difference between the first time and the second time.

17. The server of claim 15, wherein the controller is further configured to:
estimate a latency in transmission from the server to the vehicle based on a difference between the first time and the second time.

18. A traffic management system comprising:
a plurality of sub systems; and
at least one main system being in a higher hierarchical level than the plurality of sub systems, wherein:
each of the plurality of sub systems is configured to:
receive data from one or more vehicles indicating a traffic state at a first time;
transmit the data received from the one or more vehicles to the main system;
receive, from the main system, driving instructions for at least one of the one or more vehicles; and
transmit the driving instructions for the at least one of the one or more vehicles to the at least one of the one or more vehicles; and
the at least one main system is configured to:
receive the data from the plurality of sub systems;
determine a traffic state at the first time based on the data received from the plurality of sub systems;
estimate a second time at which the at least one of the one or more vehicles will receive the driving instructions transmitted by one of the sub systems;
predict a traffic state at the second time based on the determined traffic state at the first time and the estimated second time;
determine the driving instructions for the at least one of the one or more vehicles to achieve a predetermined goal, based on the predicted traffic state at the second time; and
transmit the determined driving instructions to one or more of the sub systems to cause the vehicle to perform autonomous driving to implement the driving instructions.

19. The traffic management system of claim 18, wherein the at least one main system is further configured to:
estimate a first latency in transmission from the one or more vehicles to the plurality of sub systems;
estimate a second latency in transmission from the plurality of sub systems to the main system;
estimate a third latency in transmission from the main system to the plurality of sub systems;
estimate a fourth latency in transmission from the plurality of sub systems to the one or more vehicles; and
estimate the second time at which the at least one of the one or more vehicles will receive the driving instructions transmitted by one of the sub systems based on the first latency; the second latency, the third latency, and the fourth latency.

20. The traffic management system of claim 18, wherein:
each of the plurality of sub systems is configured to receive a timestamp from the one or more vehicles indicating a time that the data was sent by the one or more vehicles and transmit the timestamp to the main system; and
the main system is configured to estimate the second time at which the at least one of the one or more vehicles will receive the driving instructions transmitted by one of the sub systems based on a difference between the time that the data was sent by the one or more vehicles and a time that the data was received by the main system.

* * * * *

UNITED STATES PATENT AND TRADEMARK OFFICE
CERTIFICATE OF CORRECTION

PATENT NO. : 11,852,496 B2
APPLICATION NO. : 17/144561
DATED : December 26, 2023
INVENTOR(S) : Yusuke Hara It is certified that error appears in the above-identified patent and that said Letters Patent is hereby corrected as shown below:

On the Title Page

Item (71), applicant 2, city, delete "Toyota" and insert --Toyota-shi Achin-Ken--, therefor.

Item (72), inventor 1, city, delete "Toyota" and insert --Toyota-shi, Achin-Ken--, therefor.

In the Specification

In Column 9, Line(s) 60, after "time", delete "to" and insert --$t_0$--, therefor.

In Column 9, Line(s) 61, after "time", delete "to" and insert --$t_0$--, therefor.

In Column 10, Line(s) 13, after "time", delete "to" and insert --$t_0$--, therefor.

In Column 10, Line(s) 52, after "time", delete "to" and insert --$t_0$--, therefor.

Signed and Sealed this
Thirtieth Day of July, 2024

Katherine Kelly Vidal
*Director of the United States Patent and Trademark Office*